US010098199B2

(12) United States Patent
Bowers et al.

(10) Patent No.: US 10,098,199 B2
(45) Date of Patent: Oct. 9, 2018

(54) ARCHITECTURES FOR LIGHT EMITTING DIODE (LED) LIGHTING SYSTEMS

(71) Applicants: David Bowers, San Jose, CA (US);
Thomas Poliquin, Aptos, CA (US);
Dustin Cochran, Aptos, CA (US);
Matthew D. Weaver, Aptos, CA (US);
Jay Hurley, Watsonville, CA (US);
James Kingman, Woodside, CA (US);
Bryant Grigsby, Aptos, CA (US);
Sanjoy Ghose, Scotts Valley, CA (US)

(72) Inventors: David Bowers, San Jose, CA (US);
Thomas Poliquin, Aptos, CA (US);
Dustin Cochran, Aptos, CA (US);
Matthew D. Weaver, Aptos, CA (US);
Jay Hurley, Watsonville, CA (US);
James Kingman, Woodside, CA (US);
Bryant Grigsby, Aptos, CA (US);
Sanjoy Ghose, Scotts Valley, CA (US)

(73) Assignee: LUMENETIX, INC., Scotts Valley, CA (US)

( * ) Notice: Subject to any disclaimer, the term of this patent is extended or adjusted under 35 U.S.C. 154(b) by 7 days.

(21) Appl. No.: 15/382,575

(22) Filed: Dec. 16, 2016

(65) Prior Publication Data
US 2017/0142802 A1    May 18, 2017

Related U.S. Application Data

(63) Continuation-in-part of application No. 14/458,457, filed on Aug. 13, 2014, now abandoned.
(Continued)

(51) Int. Cl.
H05B 37/02    (2006.01)
H05B 33/08    (2006.01)

(52) U.S. Cl.
CPC ..... H05B 33/0866 (2013.01); H05B 33/0845 (2013.01); H05B 33/0851 (2013.01);
(Continued)

(58) Field of Classification Search
CPC ............ H05B 33/0845; H05B 33/0857; H05B 37/0227; H05B 37/0254; H05B 7/032; H05B 37/036
(Continued)

(56) References Cited

U.S. PATENT DOCUMENTS 6,127,783 A * 10/2000 Pashley .................... F21V 9/10
250/205
9,706,611 B2 * 7/2017 Walters .............. H05B 33/0812
(Continued)

Primary Examiner — Tung X Le
(74) Attorney, Agent, or Firm — Perkins Coie LLP

(57) ABSTRACT

Various embodiments relate to systems and methods for controlling one or more LED-based lighting sources that are coupled to a logic module by a ribbon cable. The ribbon cable allows some or all of the processing components (e.g., processors and drivers) to be decoupled from the LED-based lighting source(s). The processing components can instead be housed within the logic module, which is able to simultaneously control the LED-based lighting source(s). Together with color models established for each LED board, the logic module acts as a platform for modularity and is able to more precisely control the color channels of each LED-based lighting source using the color models established for those LED-based lighting source(s). Techniques are also described herein that allow the logic module to utilize data stored within an erasable programmable read-only memory (EPROM) that describes the color characteristics of an LED-based lighting source.

24 Claims, 14 Drawing Sheets

Related U.S. Application Data

(60) Provisional application No. 62/269,045, filed on Dec. 17, 2015.

(52) U.S. Cl.
CPC ..... *H05B 37/0227* (2013.01); *H05B 37/0254* (2013.01); *H05B 37/0272* (2013.01); *H05B 37/0281* (2013.01)

(58) Field of Classification Search
USPC .................................. 315/307, 312
See application file for complete search history.

(56) References Cited

U.S. PATENT DOCUMENTS

| | | | | |
|---|---|---|---|---|
| 2008/0203945 A1* | 8/2008 | Deurenberg | ......... | H05B 33/086 315/307 |
| 2010/0176746 A1* | 7/2010 | Catalano | .................. | G01K 7/01 315/297 |
| 2010/0259182 A1* | 10/2010 | Man | ................... | H05B 33/0863 315/250 |
| 2011/0018465 A1* | 1/2011 | Ashdown | ........... | H05B 33/0818 315/294 |
| 2011/0309754 A1* | 12/2011 | Ashdown | ........... | H05B 33/0818 315/151 |
| 2012/0206050 A1* | 8/2012 | Spero | ...................... | B60Q 1/04 315/152 |
| 2013/0320869 A1* | 12/2013 | Jans | .................. | H05B 33/0803 315/186 |

\* cited by examiner

ARCHITECTURES FOR LIGHT EMITTING DIODE (LED) LIGHTING SYSTEMS

CROSS-REFERENCE TO RELATED APPLICATIONS

This application is a Continuation-in-Part of U.S. patent application Ser. No. 14/458,457, entitled "Architecture of a Tunable Lamp System" and filed Aug. 14, 2014. This application claims priority to and the benefit of U.S. Provisional Application No. 62/269,045, entitled "Architectures for Light Emitting Diode (LED) Lighting Systems" and filed on Dec. 17, 2015. Both U.S. patent application Ser. No. 14/458,457 and U.S. Provisional Application No. 62/269,045 are incorporated by reference in their entirety.

FIELD OF THE INVENTION

Various embodiments concern hardware architectures for lighting systems and, more specifically, techniques for designing and controlling lighting systems.

BACKGROUND

Traditional lighting systems typically rely on conventional lighting technologies, such as incandescent bulbs and fluorescent bulbs. But these light sources suffer from several drawbacks. For example, such light sources do not offer long life or high energy efficiency. Moreover, such light sources offer only a limited selection of colors, and the color of light output by these light sources generally changes over time as the bulbs age and begin to degrade. Consequently, light emitting diodes (LEDs) have become an attractive option for many applications. The vast majority of LED-based lighting systems, however, use fixed white LEDs with no tunable range.

Although LED-based systems are capable of having longer lives and offering high energy efficiency, several issues still exist including the degradation of color over time and the responsiveness of color tuning adjustments. These issues can be compounded when multiple LED-based lighting systems are placed near one another or are coupled directly to one another.

Moreover, printed circuit board assemblies (PCBAs) with LEDs often exhibit undesirable acoustic effects when the PCBAs are driven at particular (e.g., resonant) frequencies in the human hearing range (e.g., approximately 50 Hz to 25 kHz). For instance, sound may be produced by vibrating capacitors, such as piezoelectric ceramic capacitors that change dimensions in response to an applied voltage. Some inductors may also create noise by magnetostriction. Although solutions (e.g., specialty dampeners, low drive acoustic capacitors) have been proposed in an effort to reduce or eliminate these acoustic effects, this problem continues to plague PCBAs regardless of application (i.e., not just when used as part of a lighting system).

A light source can be characterized by its color temperature and by its color rendering index (CRI). The color temperature of a light source is the temperature at which the color of light emitted from a heated black body radiator is matched by the color of the light source. For a light source that does not substantially emulate a black body radiator, such as a fluorescent bulb or LED, the correlated color temperature (CCT) of the light source is the temperature at which the color of light emitted from a heated black body radiator is approximated by the color of the light source.

The CCT can also be used to represent chromaticity of white light sources. But because chromaticity is two-dimensional, Duv (as defined in ANSI C78.377) can be used to provide another dimension. When used with a MacAdam ellipse (which represents the colors distinguishable to the human eye), the CCT and Duv allow the visible color output by an LED-based lighting system to be more precisely controlled (e.g., by being tuned).

The CRI, meanwhile, is a rating system that measures the accuracy of how well a light source reproduces the color of an illuminated object in comparison to an ideal or natural light source. The CRI is determined based on an average of eight different colors (R1-R8). A ninth color (R9) is a fully saturated test color that is not used in calculating CRI, but can be used to more accurately mix and reproduce the other colors. The CCT and CRI of LEDs is typically difficult to tune and adjust. Further difficulty arises when trying to maintain an acceptable CRI while varying the CCT of an LED.

BRIEF DESCRIPTION OF THE DRAWINGS

Various objects, features, and characteristics will become more apparent to those skilled in the art from a study of the following Detailed Description in conjunction with the appended claims and drawings, all of which form a part of this specification. While the accompanying drawings include illustrations of various embodiments, the drawings are not intended to limit the claimed subject matter.

Figure 1A:
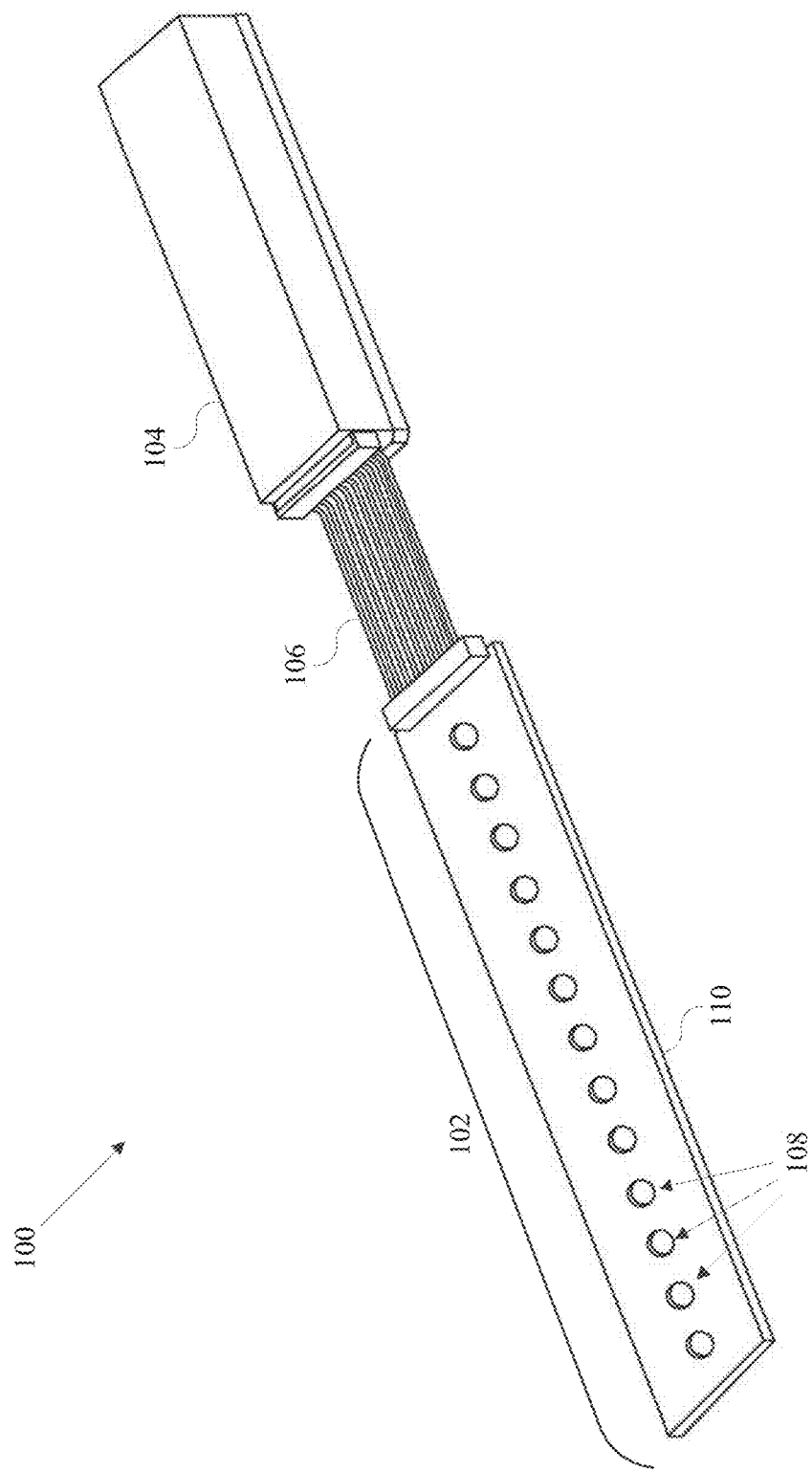
FIG. 1A depicts one example of an LED-based lighting system that includes an LED-based light source (e.g., an LED board) coupled to a logic module by a ribbon cable as may occur in some embodiments.
Figure 1B:
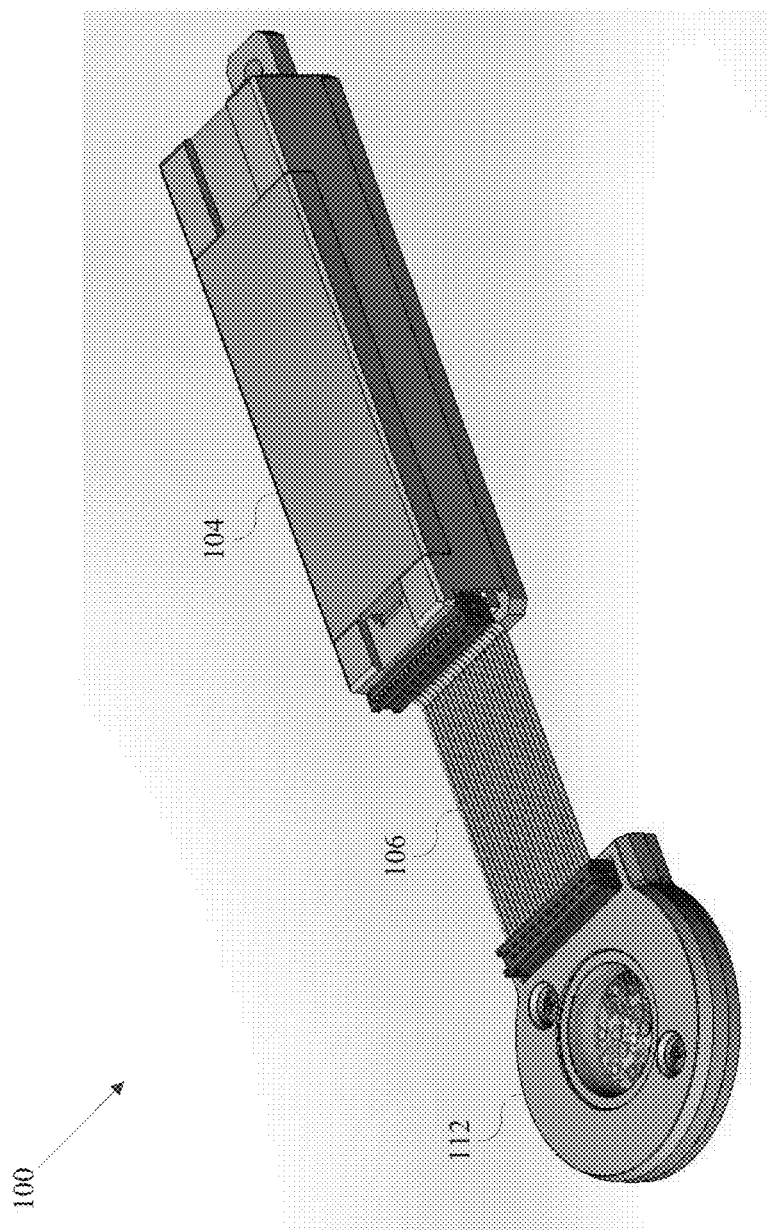
FIG. 1B depicts another example of an LED-based lighting system as may occur in some embodiments.
Figure 1C:
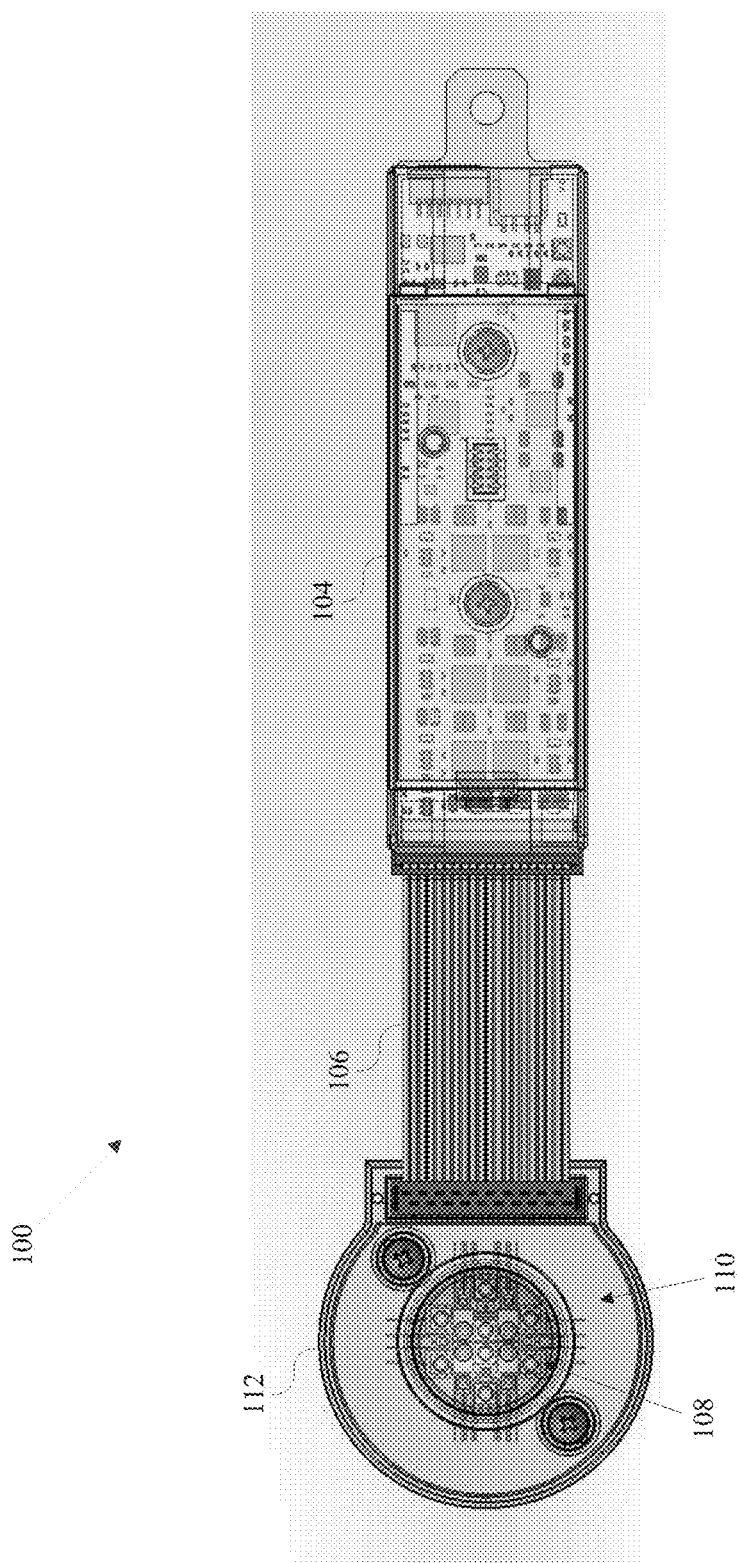
FIG. 1C is a bottom cutaway view of the LED-based lighting system shown in FIG. 1B.
Figure 1D:
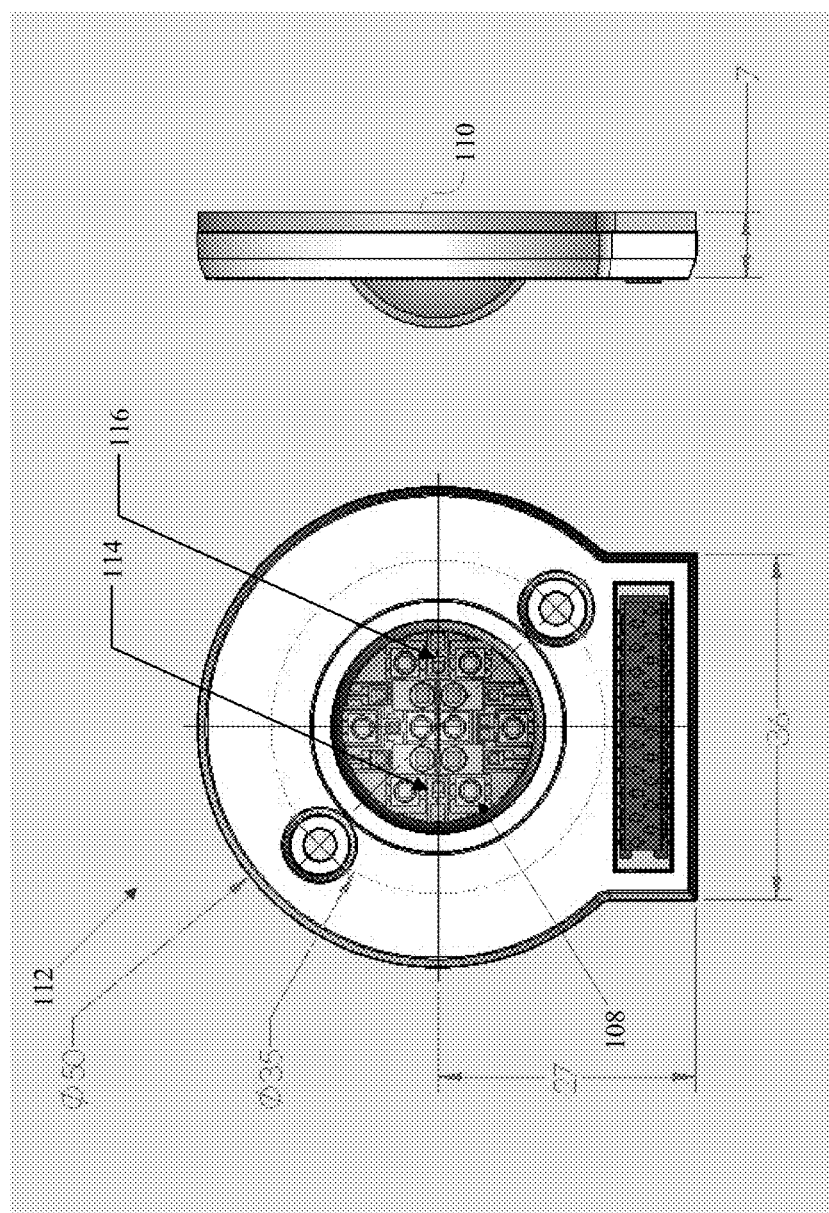
FIG. 1D depicts one example of an LED-based light source that could be coupled to a logic module.
Figure 2A:
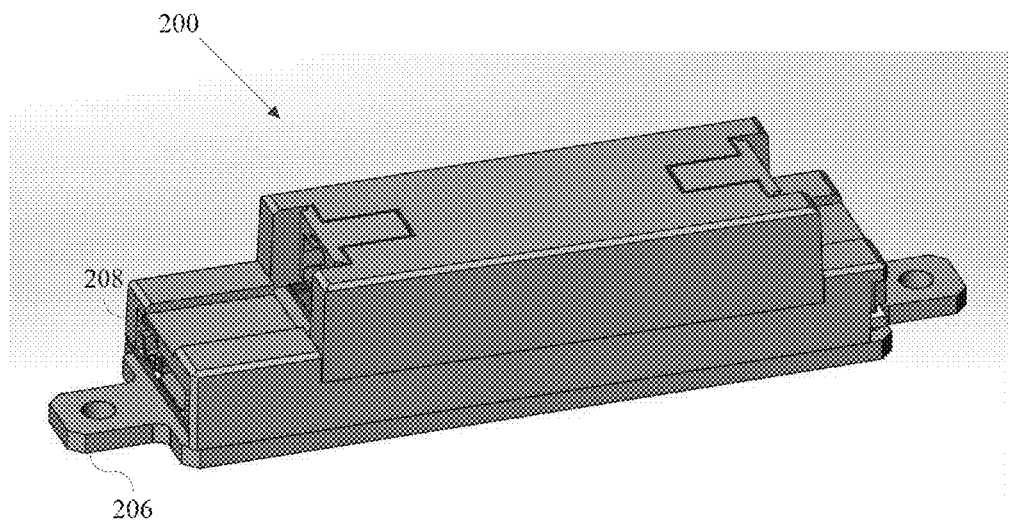
FIG. 2A depicts a logic module that includes a mounting plate and a motherboard that can be coupled to one or more daughterboards (e.g., via a daughterboard connector).
Figure 2B:
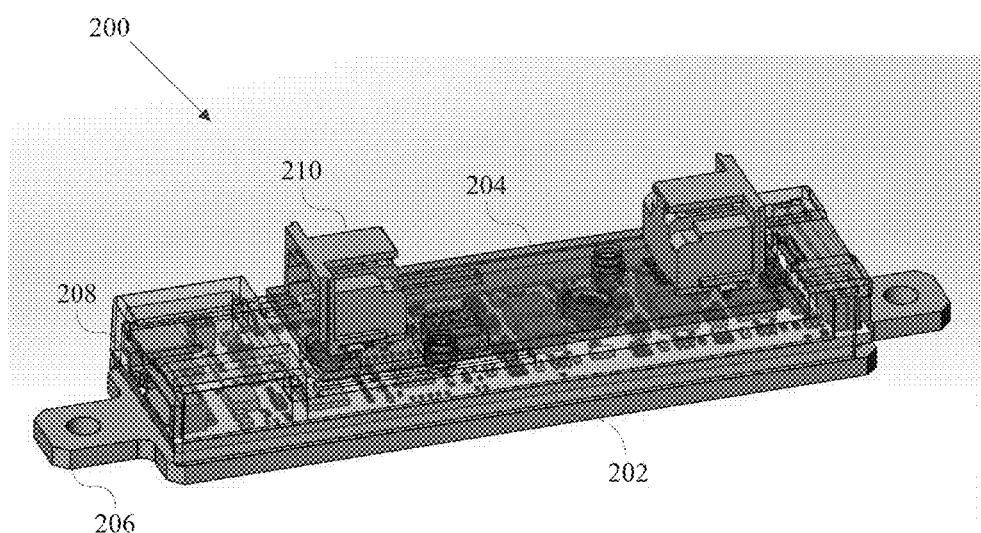
FIG. 2B depicts a cutaway drawing of the logic module shown in FIG. 2A.
Figure 2C:
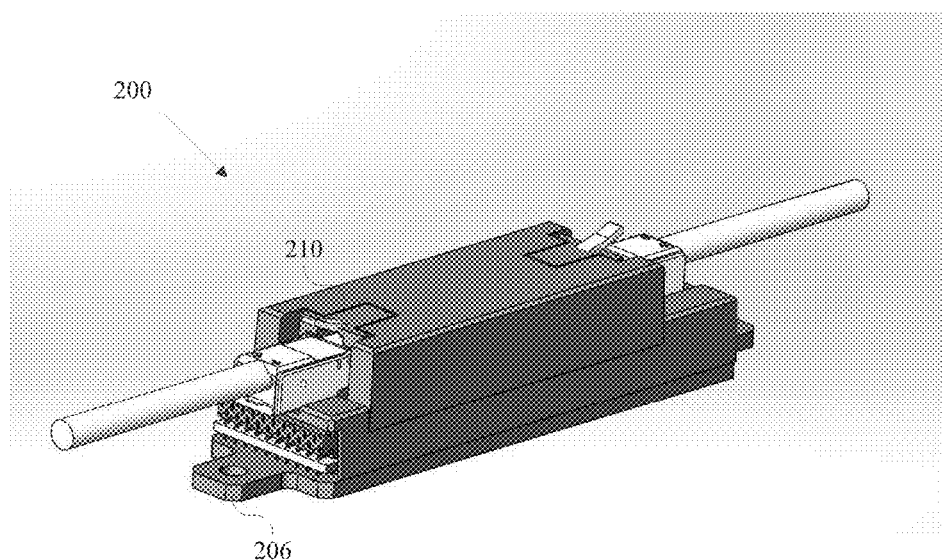
FIG. 2C illustrates how the logic module may include one or more ports for receiving cables for transferring power, data, etc.
Figure 2D:
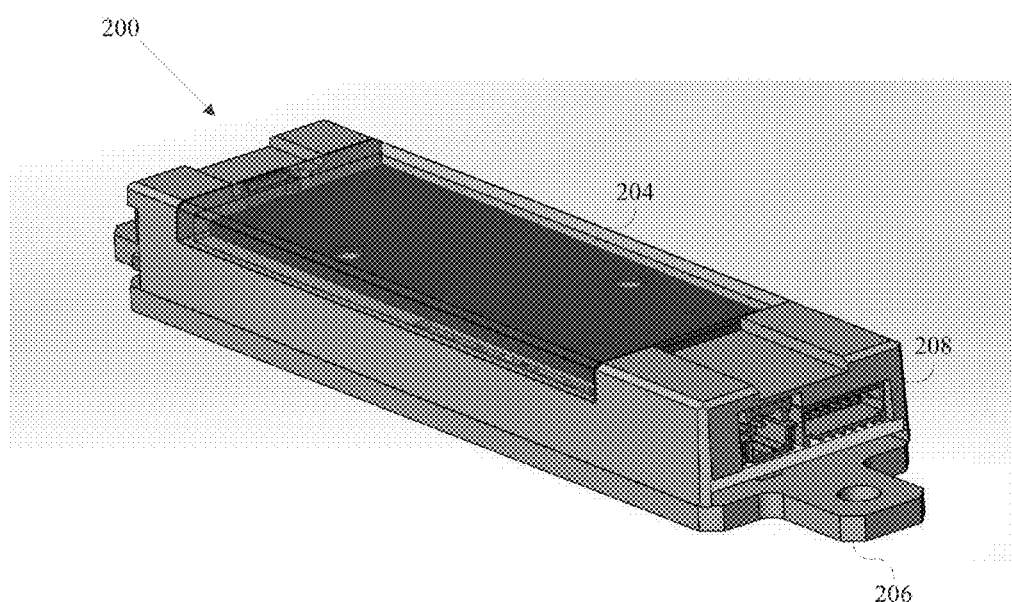
FIG. 2D depicts one example of a logic module having a cavity for retaining a daughterboard that enables a certain functionality.
Figure 2E:
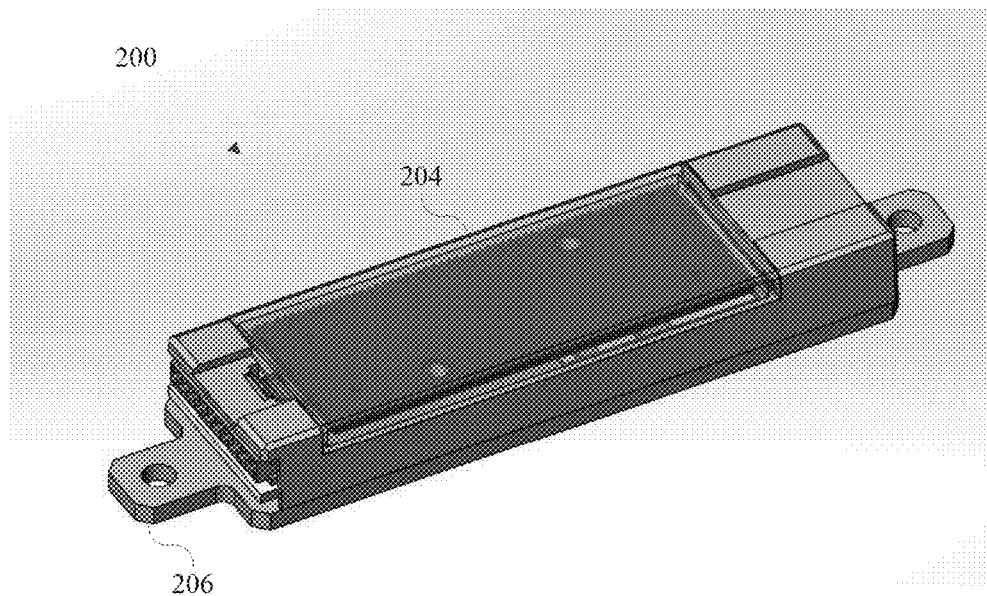
FIG. 2E depicts another example of a logic module coupled to a daughterboard.
Figure 2F:
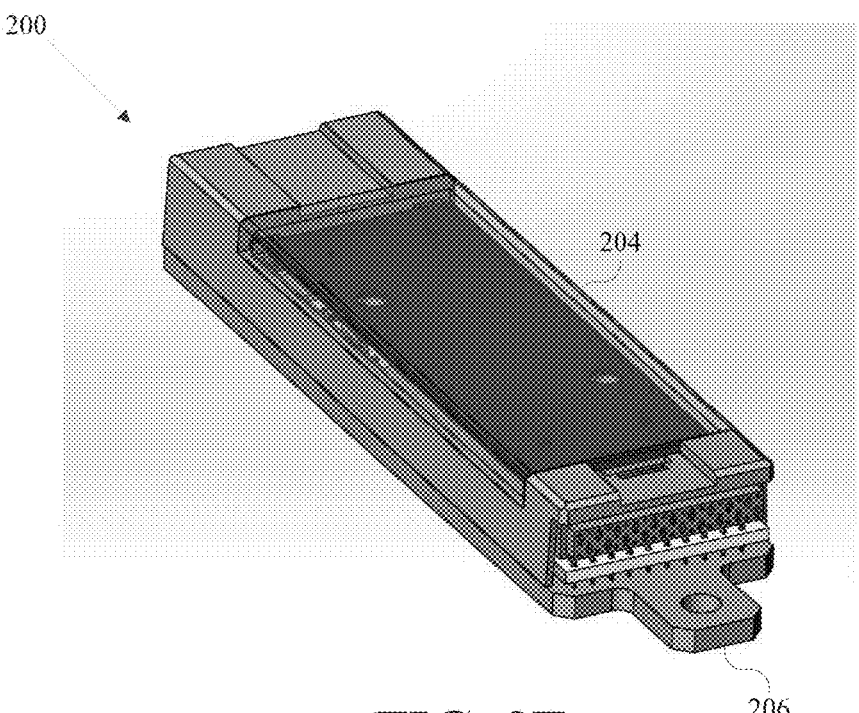
FIG. 2F depicts another example of a logic module coupled to a daughterboard.

The figures depict various embodiments for the purposes of illustration only. While specific embodiments have been shown by way of example in the drawings and are described in detail below, the embodiments are amenable to various modifications and alternative forms. The intention is not to limit the disclosure to the particular embodiments described. Accordingly, the claimed subject matter is intended to cover all modifications, equivalents, and alternatives falling within the scope of the invention as defined by the appended claims.

DETAILED DESCRIPTION

Various embodiments are described herein that relate to techniques for controlling lighting systems. More specifically, various embodiments relate to systems and methods for controlling light emitting diode (LED) boards, fixtures, etc., that are coupled to a logic module by a ribbon cable. The ribbon cable allows some or all of the processing components (e.g., processors and drivers) to be decoupled from the LED board. The aforementioned processing components can instead be housed within the logic module, which is able to simultaneously control one or more LED boards. Together with color models established for each LED board, the logic module acts as a platform for modularity and is able to more precisely control the color channels of each LED board using the color models established for that board. A "color channel" refers to the one or more LEDs of a particular color on an LED board. Therefore, an LED board having five color channels includes LEDs of five different colors.

Techniques are also described herein that allow the logic module to utilize data describing the color characteristics (e.g., color model, spectral power distribution, tristimulus values) of an LED board. Generally, the data is stored within the erasable programmable read-only memory (EPROM) coupled directly to the LED board; however, one skilled in the art will recognize that any other suitable form of memory may also be used (e.g., an LED board may include flash memory rather than an EPROM). However, in some embodiments, the LED board may be configured to wirelessly store and/or retrieve the data from a cloud-based storage solution (e.g., via Bluetooth, Near Field Communication (NFC), Wi-Fi, or some other wireless communication channel). Low resolution versions of the spectral power distribution (SPD) of a particular LED board at various operating conditions can be created and stored within the EPROM. These low resolution versions can then be retrieved by the logic module from the EPROM and used to better control the mixing of the color channels of the LED board and improve visible output. Color model(s) and/or tristimulus value(s) could also be stored within the EPROM for retrieval by the logic module.

The technologies introduced herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or another electronic device) to perform a process. The machine-readable medium may include, but is not limited to, floppy diskettes, optical disks, compact disk read-only memories (CD-ROMs), magneto-optical disks, read-only memories (ROMs), random access memories (RAMs), EPROMs, electrically erasable programmable read-only memories (EEPROMs), magnetic or optical cards, flash memory, or any other type of media/machine-readable medium suitable for storing electronic instructions.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" or "in some embodiments" in various places in the specification are not necessarily all referring to the same embodiment(s), nor are separate or alternative embodiments mutually exclusive of other embodiments. Moreover, various features are described which may be exhibited by some embodiments and not by others. Similarly, various requirements are described which may be requirements for some embodiments but not other embodiments.

Unless the context clearly requires otherwise, throughout the Detailed Description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. For example, two devices may be coupled directly to one another, or via one or more intermediary channels or devices. As another example, devices may be coupled in such a way that information can be passed there between, while not sharing any physical connection with one another.

Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware (or any combination thereof) components. Modules are typically functional components that can generate useful data or other output using specified input(s). A module may or may not be self-contained.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted using capitalization, italics, and/or quotation marks. The use of highlighting has no influence on the scope and meaning of a term. The scope and meaning of a term is the same, in the same context, whether or not it is highlighted. It will be appreciated that the same element can be described in more than one way.

Consequently, alternative language and synonyms may be used for any one or more of the terms discussed herein. However, special significance is not to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to the various embodiments given in this specification.

System Topology Overview

FIGS. 1A-D depict examples of LED-based lighting systems 100 that include an LED-based light source, such as an LED board 102 or an LED fixture 112, coupled to a logic module 104 (which may also be referred to as a color tuning module) by a ribbon cable 106. By separating one or more processing components (e.g., processors, drivers, power couplings) from the LED-based light source, the techniques described herein enable the necessary driver(s), processor(s), etc., to be housed within the logic module 104 rather than on the LED-based light source. Consequently, an LED board 102 can be intelligently controlled by the logic module 104, despite the LED board 102 not retaining the necessary components itself. As will be further described below with respect to FIG. 3, these techniques also allow a single logic module 102 to simultaneously control multiple LED boards or fixtures, each of which may be coupled to the logic module 104 by a separate ribbon cable. Further details regarding possible system architectures of tunable lamp systems can be found in co-pending U.S. application Ser. No. 14/458,457, which is incorporated herein by reference in its entirety.

Although the LED board 102 is illustrated by FIG. 1 as an array of LEDs 108 positioned linearly on a substrate, other arrangements are also possible and, in some cases, may be preferable. For example, an LED board 102 or an LED fixture 112 may include a circular arrangement or cluster of mid-power LEDs, a single high power LED, or some other lighting feature.

Conventionally, a group of LED boards are serially coupled to one another and any processing and/or multiplexing would be performed locally (e.g., by the drivers present on each LED board). But this can cause several issues. For example, the processing components are distributed amongst the group of LED boards, rather than consolidated into a single structural component, which makes identifying problems and servicing those processing components more difficult. Moreover, adding processing components to each LED board increases production cost, the total power needed by the LED board, the heat generated by the LED board during use, the total space consumed by (i.e., the footprint of) the LED board, etc. By coupling the LED board 102 to a distinct logic module 104, processing can instead be performed remotely (i.e., not on or by the LED board 102 itself), which solves many of the aforementioned problems.

Note, however, that the LED board 102 could include one or more components for intelligently controlling how light is emitted. For example, the LED board 102 may include a dedicated memory and a microprocessor that is able to communicate with the logic module 104. In some embodiments, the LED board 102 also includes a communication module that enables the LED board 102 to communicate via a wireless transmission protocol (e.g., Bluetooth, NFC, or Wi-Fi). Accordingly, the processing components (e.g., processors, drivers, power couplings) for the LED-based lighting system 100 may be distributed across the logic module 104 and the LED board 102. As further described below, such an arrangement allows logic modules and LED-based light sources (e.g., LED boards and LED fixtures) to be used interchangeably with one another.

The ribbon cable 106 allows the processing components (e.g., drivers, processors) to be physically decoupled from the LED board 102. The ribbon cable 106 shown here includes conducting wires running parallel to one another on the same flat plane, although round ribbon cables could also be used in some embodiments. Whether the ribbon cable 106 is wide and flat (as shown here) or bundled together in a cord may depend on constraints imposed on the lighting system 100 by the local environment, such as the available space and the route to be taken by the ribbon cable 106 (e.g., through a lighting troffer). Moreover, in some embodiments, the LED board 102 and logic module 104 may each include one or more modules for wirelessly transmitting data, power, etc., that render the ribbon cable 106 partially or entirely unnecessary.

The ribbon cable 106, which carries a mix of analog and digital signals, can include a series of wires adapted for different purposes. For example, the ribbon cable 106 can include two wires that carry a variable current signal and a pulse-width modulation (PWM) signal for each color channel (that together form a high/low differential pair), one or more wires for photodiodes that provide optical feedback, one or more wires for thermistors that provide thermal feedback, one or more wires that serve as ground(s) for the thermistor(s), and one or more wires for an EPROM (e.g., separate wires for a power signal, clock signal, and data signal) positioned on the LED board 102. Other embodiments can include some subset of these wires and/or additional wires.

As further described below, the wire(s) corresponding to the EPROM allow the logic module 104 to retrieve data from the EPROM that specifies, for example, color characteristics of the LEDs on the LED board 102. The thermistors 114 and photodiodes 116, meanwhile, can be used to measure thermal and optical feedback, respectively. For example, the thermistors may be used to measure thermal feedback initially, and then after the expiration of a predetermined time period, the photodiodes may be used to measure the optical feedback to see whether aging has affected the output of the LEDs. The ground wire(s) could be distinct from one another (e.g., a different ground for each thermistor) or shared (e.g., a single ground wire shared between two thermistors).

Using a ribbon cable 106 to couple the LED board 102 to the logic module 104 also allows a user to clamp the ribbon cable 106 and stream replicated signals to one or more other LED boards. Clamping the ribbon cable 106 allows the logic module 104 to simultaneously control a series of LED boards that have been physically and logically linked together.

Oftentimes, the logic module 104 is configured to receive the ribbon cable 106 (or multiple ribbon cables) at different locations. For example, the logic module 104 may have multiple ribbon cable ports on one side of the structure (e.g., stacked adjacent to one another) or on multiple sides of the structure (e.g., a single port positioned on each end of the logic module 104). The design of the logic module 104 may also depend on the mounting scheme intended to be used by the logic module 104 (e.g., within a light enclosure or lighting troffer).

The LED board 102 can be composed of any suitable substrate backing 110 able to appropriately dissipate heat generated by the LEDs 108. Specific non-metal substrates, such as a woven fiberglass cloth with an epoxy resin binder (e.g., FR4), may be used to reduce or eliminate various problems associated with metal substrates. For example, a substrate backing 110 composed of FR4 can more efficiently dissipate the heat generated by multiple color channels and not experience the heat retention issues typically encountered by metal substrates. The use of FR4 is enabled by the use of mid-power LEDs, rather than high-power LEDs, which typically require a metal substrate. As another example, FR4 can be more easily divided into separate layers for each color channel.

FIGS. 2A-F depict several different embodiments of logic modules 200 that include a mounting plate 206 and a motherboard 202, which can be coupled to one or more daughterboards 204 (e.g., via a daughterboard connector). As further described below, installation of a daughterboard 204 enables an additional feature/functionality on the logic module 200, such as the ability to communicate with LED boards via a particular communication protocol. The motherboard 202 can include a power adapter, one or more incoming signal connectors 210 (e.g., as RJ45 connector configured to receive DMX input control signals), a ribbon cable port 208 for receiving a ribbon cable, etc. These components and connectors can be arranged on any of the sides of the logic module 200.

As noted above, conventional LED-based light sources that include processing components are limited in the amount of power they can receive. The LED-based lighting systems described here, however, are not limited in such a manner because the processing components are stored in the logic module 200 rather than on the LED-based light source (e.g., LED boards or LED fixtures). Because power is provided directly to the logic module 200, the total amount of supplied power can be increased (e.g., up to 80 watts), which allows the logic module 200 to be coupled to and simultaneously tune the color of multiple LED boards (e.g., 8 or more LED boards at a time). This is particularly advantageous when the amount of available space is limited within a light enclosure or lighting troffer.

Removing the processing components from the LED-based light sources allows space to be more efficiently utilized within the light enclosure or lighting troffer. For example, removal of the processing components enables the dimensions of an LED board to be decreased.

The logic module 200 may be configured to support several basic functions without any daughterboards 204 needing to be installed. For example, Bluetooth and DMX signals may be receivable by an unmodified logic module 200 (i.e., a logic module that does not include any daughterboards). Other components, such as a power supply or a module/connector for a proprietary control technology, could also be added to the logic module 200 to enable additional features or functionalities. The logic module 200 effectively serves as a modifiable interface that allows LEDs to be more readily and precisely controlled.

Partitioning of the logic module 200 allows the motherboard 202 to be coupled to one or more daughterboards 204 (e.g., modules) that provide a particular functionality. Said another way, the logic module 200 acts as a partitioned platform that enables modularity of a system for controlling LEDs. The daughterboard(s) 204 could, for example, allow the logic module 200 to communicate in accordance with a certain communication protocol. In some embodiments, multiple daughterboards can be "stacked" (i.e., simultaneously coupled to the logic module 200), thereby providing multiple functionalities. The modular motherboard-daughterboard design discussed here allows the logic module 200 to be readily re-configured after the logic module 200 has been installed. For example, the logic module could be adapted to communicate in accordance with a different protocol after being installed within a troffer. These post-installation reconfigurations are not possible in conventional lighting systems.

This architecture can also provide other unique benefits. For example, the logic module 200 may include a port (e.g., for Ethernet) in or near the daughterboard connector 208 (or within the daughterboard 204 itself).

EPROM Feedback

Figure 3:
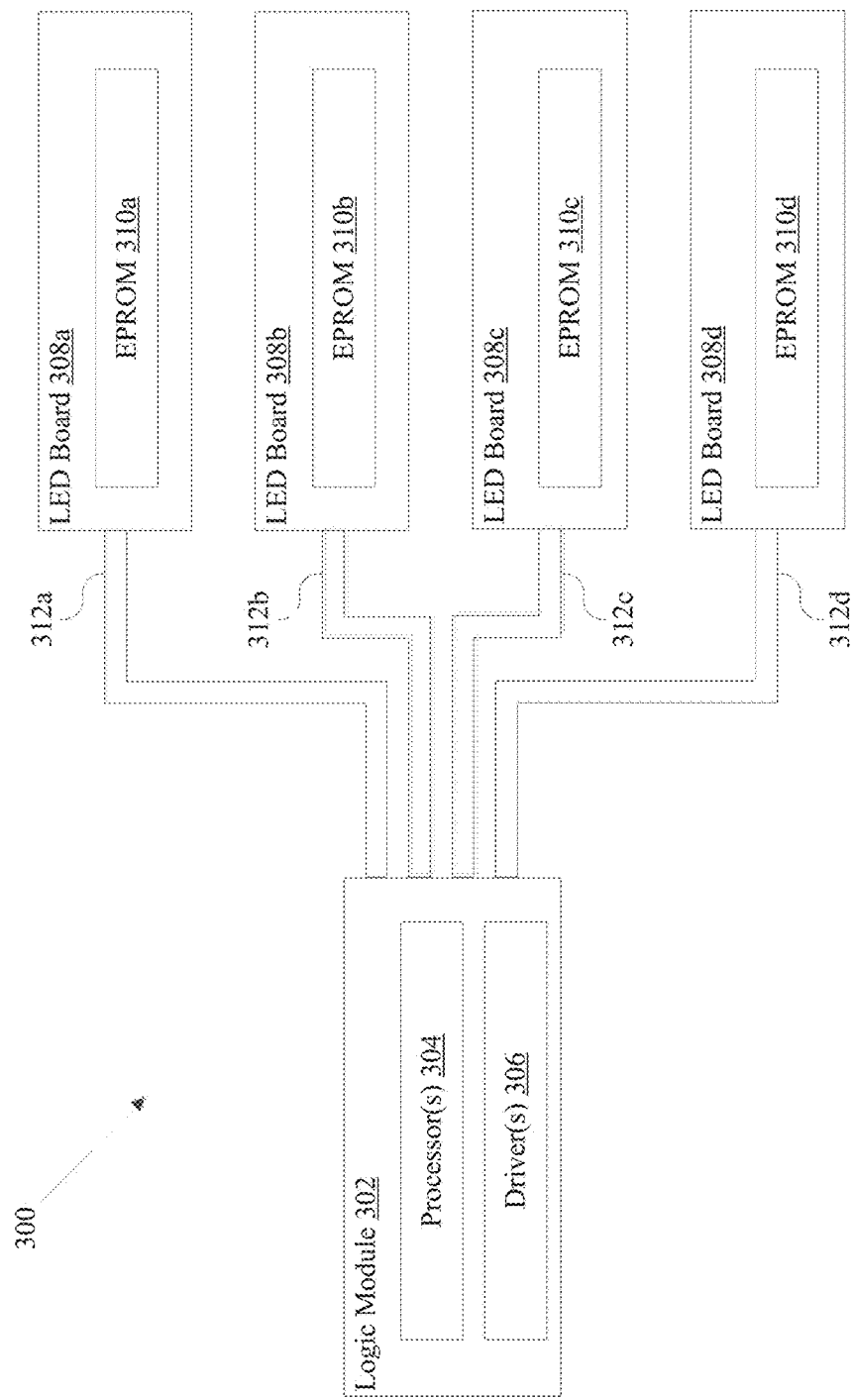
FIG. 3 is a generalized block diagram of a lighting system that includes a series of LED boards, each having an EPROM.

FIG. 3 is a generalized block diagram of a lighting system 300 that includes a series of LED boards 308a-d, each having a unique EPROM 310a-d. The series of LED boards 310a-d is controlled by a single logic module 302 that determines how to manage (e.g., controllably tune the color of) the LEDs on each board. This issue does not plague conventional control systems because those systems instead place the necessary processing components (e.g., processors 304 and drivers 306) on each individual LED board 308a-d.

The logic module 302 preferably considers the characteristics of the color channels on each LED board when controllably tuning the lighting system 300 as a whole. For example, it may be desirable to merge a color model stored in the EPROMs 310a-b of each LED board 308a-d in a certain manner to more effectively control the LEDs. The ability to retrieve and analyze board-specific color information takes on additional importance when the logic module 302 receives feedback from multiple LED boards 308a-d.

For example, the logic module 302 may receive a signal from each LED board 308a-d that specifies a characteristic (e.g., product number or name) that uniquely identifies the corresponding LED board. As another example, the logic module 302 may receive isolated feedback for each LED board 308a-d by selectively turning off whichever color channel(s) the logic module 302 is not communicating with at a given point in time. The isolated feedback received for each LED board could affect how the logic module 302 controls the group of LED boards 308a-d as a whole. The isolated feedback could also be used to identify a particular LED board that needs to be replaced because, for example, the visibility output of the LEDs has fundamentally shifted due to production over time or the forward voltage ($V_f$) has dropped.

For each LED board 308a-d, a static color model can be created based on a reasonable sample of "un-binned" LEDs in a set configuration, as described in co-pending U.S. application Ser. No. 13/766,707, which is incorporated herein by reference in its entirety. Oftentimes, it is desirable to examine the difference between an average of "n" color models and a color model created from an average of "n" sets of spectral power distributions (SPDs), where "n" represents an integer value.

When a color model generated from a set of averaged SPDs produces a reasonable result, the required SPDs can be stored (e.g., in a reduced data format) in the EPROM 310a-d of the corresponding LED board 308a-d in a reduced data format. For instance, one reduced data format described herein is the SPD quantized integer (SQUINT) format. The set of required SPDs can then be used for research, testing, etc. In such a scenario, each LED board 308a-d includes its own SPD characterization stored within its own EPROM 310a-d. Other information characterizing an LED board, such as various color models, tristimulus values, and forward voltages, could also be stored in the corresponding EPROM in a normal or reduced data format.

In some embodiments, each SPD distribution summary further characterizes a corresponding color string with tristimulus values across different electric current values and temperature values when light produced by the corresponding color string is reflected off of the different conventional color cards (e.g., Color Rendering Index, Color Quality Scale, or TM30, which measures color rendering based on a comparison to a color palette of 99 colors).

Each SPD distribution summary may also include a thermal matrix that characterizes thermal cross-talk and capacity characteristics of adjacent light sources in the corresponding color string. In such embodiments, the thermal matrix may be transmitted from the LED board to the logic module, which considers the terminal matrix when re-calibrating the color model.

When the lighting system 300 is powered on, the logic module 302 can determine which LED boards 308a-d are attached to the logic module 302. If a new LED board (or new set of LED boards) is detected, the reduced data files (e.g., reduced SPDs) are read from the EPROM(s) of those new LED board(s) by the logic module 302, and an appropriate adjustment can be made to the color model employed by the logic module 302 based on the desired target and any differences between the ideal SPD(s) and the average of the SPDs stored by the attached LED boards 310a-d. For example, the logic module 302 may selectively tune the color one or more particular LED boards 308a-d to more accurately replicate a desired color model.

One skilled in the art will recognize that the information stored within the reduced data files could be conveyed in several different ways. For example, SPD information for a given LED board could be captured within a unique visual design that is printed or affixed to an LED board. The unique visual design could be, for example, a barcode or Quick Response (QR) code. In such embodiments, the SPD information can be stored in a network-accessible storage medium (and conveyed by the unique visual design) rather than a file stored within an EPROM of the LED board.

Moreover, using a unique visual design to convey such information may eliminate the need for the LED board and logic module to communicate directly with one another. For example, scanning the unique visual design on an LED board may prompt a network-accessible control system (also referred to as a "cloud-based control system") to wirelessly transmit the appropriate information directly to a corresponding logic module. Wireless reception of the information may be enabled by a daughterboard that is connected to the corresponding logic module.

Figure 4:
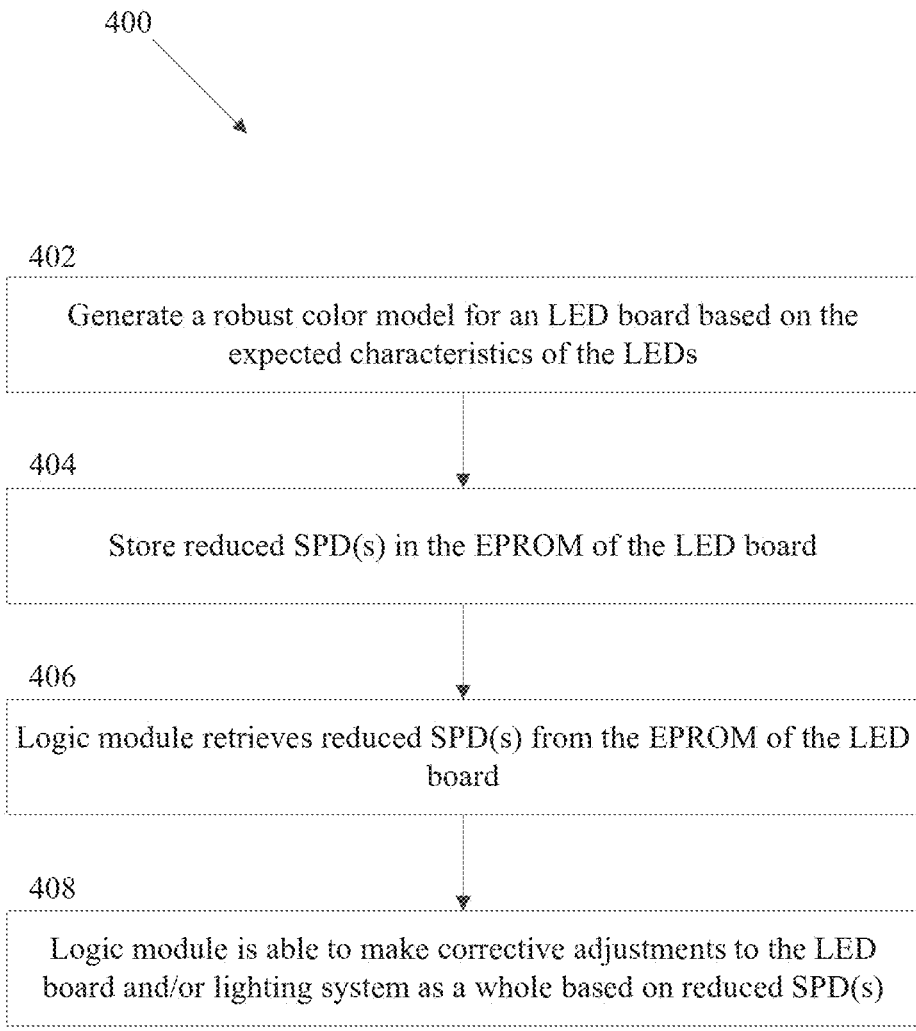
FIG. 4 depicts a process for handling the "un-binned" LEDs of one or more LED boards coupled to a logic module.

FIG. 4 depicts a process 400 for handling the "un-binned" LEDs of one or more LED boards that are coupled to a logic module. In some embodiments, rather than store a full SPD graph in the EPROM of each LED board, a low resolution version of the SPD (i.e., a "reduced SPD") is created and stored in the EPROM. A full SPD graph tends to be fairly large, while a reduced SPD typically comprises less than 100 bytes of data. Because the SPD characterizes all of the color channels on an LED board under a particular set of operating parameters (e.g., temperature, power level), it may be desirable to create and store multiple reduced SPDs that represent a variety of possible scenarios. That is, a single SPD represents the color characteristics of one or more color channels under a particular set of operating conditions (e.g., temperature, driving current).

More specifically, a reduced SPD can be created by using a reduced number of nanometer buckets (e.g., 5 nanometer). Rather than track the power in each particular wavelength range with a floating number, the wavelengths are normalized (e.g., by dividing by the peak wavelength in the SPD), and the normalized wavelengths are mapped to a 0-255 scale. Any negative numbers may be disregarded and treated as zeroes during this process. Thus, each wavelength "bucket" includes a single byte. By throwing out all measurements less than 400 nanometers and greater than 800 nanometers, the full SPD can be characterized in a much simpler manner that is still sufficient for many calculations. Other wavelength ranges could be used in alternative embodiments.

Because the total compression of the full SPD graph is substantial (e.g., nearly 40×), a wide variety of spectral data for each LED board at various power levels and temperature settings can be stored within the EPROM. The LED board, therefore, can effectively carry a virtual spectrometer of its initial state and provide virtual spectrographic feedback using a library of reduced SPDs corresponding to various operating conditions. When the LED board is coupled to a logic module that controls one or more other LED boards, the spectral data of the reduced SPDs can be used by the logic module to better control the set of LED boards (e.g., by making modifications based on operating temperature, power level, etc.).

The reduced SPDs could be used by a lighting system in various ways. For example, a logic module may determine (e.g., using one or more thermistors) the operating temperature of each of a series of LED boards, average the operating temperatures, and identify the reduced SPD corresponding to the average operating temperature of the lighting system as a whole. Alternatively, the logic module could determine the operating temperature of each LED board in the set, identify a reduced SPD for each LED board based on the operating temperature of the corresponding LED board, and combine the reduced SPDs in some manner. The reduced SPD(s) identified by the logic module may be used to determine whether/how to tune the color of particular LED boards in a lighting system.

Because the reduced SPDs embody virtualized static models, the logic module is able to more effectively control the LED boards by simulating full spectrographic feedback. However, in some embodiments, the reduced SPDs could also be used to determine compliance with certain operating conditions, such as temperature. For example, the logic module may be configured to monitor the operating temperature based on which reduced SPDs have been used over a certain time period.

The process 400, therefore, requires that a robust color model be generated based on the expected characteristics of the LEDs on a particular LED board of the lighting system (step 402). The robust color model includes a series of reduced SPDs, where each reduced SPD represents a characterization of the LEDs of the particular LED board at a certain set of operating conditions (e.g., temperature, power level). The LED characterizations (i.e., the reduced SPDs or SQUINT files) are then stored in the EPROM of the particular LED board (step 404). Each SQUINT file represents the spectral density distribution of one or more LEDs of a single color.

When the particular LED board is implemented as part of a lighting system, a logic module may retrieve one or more reduced SPDs from the EPROM of the particular LED board (step 406), and then use the reduced SPD(s) to make corrective adjustments to the color model implemented by the logic module for the lighting system as a whole (step 408). More specifically, the logic module may make corrective adjustments to the particular LED board or to the lighting system as a whole (i.e., to other LED boards included in the lighting system). For example, the logic module may be configured to "trim" (i.e., modify) the color model without recalculating the color model in its entirety.

Figure 5:
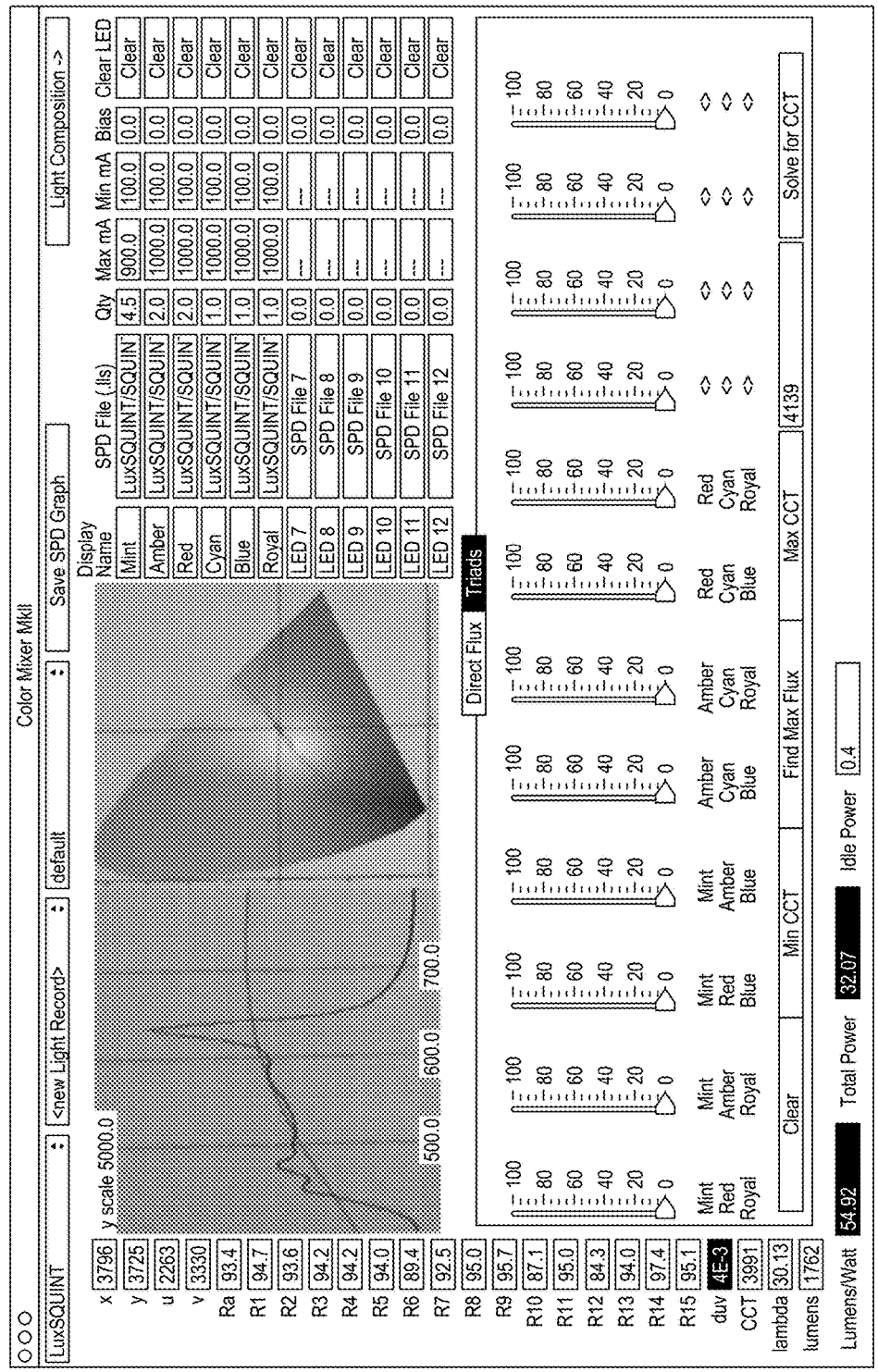
FIG. 5 depicts a user interface whose functionality can be mimicked using spectral power distributions (SPDs) stored within the EPROM(s) of the LED board(s).

FIG. 5 depicts a user interface whose functionality can be mimicked using SPDs stored within the EPROM(s) of the LED board(s). Using the interface, flux ratio(s) for set(s) of color channels can be readily determined by identifying the available colors (under "Display Name"), the quantity (under "Qty") of each color, minimum and maximum input current (under "Max mA" and Min mA"), etc. As shown in FIG. 5, triads of different colors can be identified, as well as the optimal flux ratio for each set, based on CCT (and vice versa). Said another way, the interface allows the characteristics of color LED(s) to be readily determined by specifying the operating conditions.

More specifically, to determine an "optimal" ratio corresponding to a particular CCT, the flux ratio is determined for each color set. If more than three color channels are used, there are generally many solutions, some of which have better CRI values or energy efficiency values. Note that as the number of color channels increases, the number of calculations and possibly solutions increases dramatically. CRI values have been used in the context of specific examples for the purposes of illustration only. One skilled in the art will recognize that other models may be used to communicate a light source's color rendering properties, such as TM-30-15 as approved by the Illuminating Engineering Society (IES). The method described by IES TM-30-15 (also referred to as "TM-30") encompasses several individual measures and graphics that complement one another and provide a comprehensive characterization of how light will affect the color appearance of objects. These measures include the Fidelity Index ($R_f$), Gamut Index ($R_g$), and Color Vector Graphic.

As the optics age (e.g., as the LEDs themselves age, or the LED covers and other optical elements degrade), color sets may need to be replaced. Accordingly, the LED-based lighting system (e.g., logic module) may need to re-determine the optimal flux ratios of each color set. Conventionally, maintaining proper color mixing after replacement was simply not possible because the process was computationally intensive and the proper data was unavailable. Here, however, heuristics and the SPD files can be used to mimic the functionality of the interface described above and thus re-determine the optical flux ratios.

Lighting System Topology

Figure 6A:
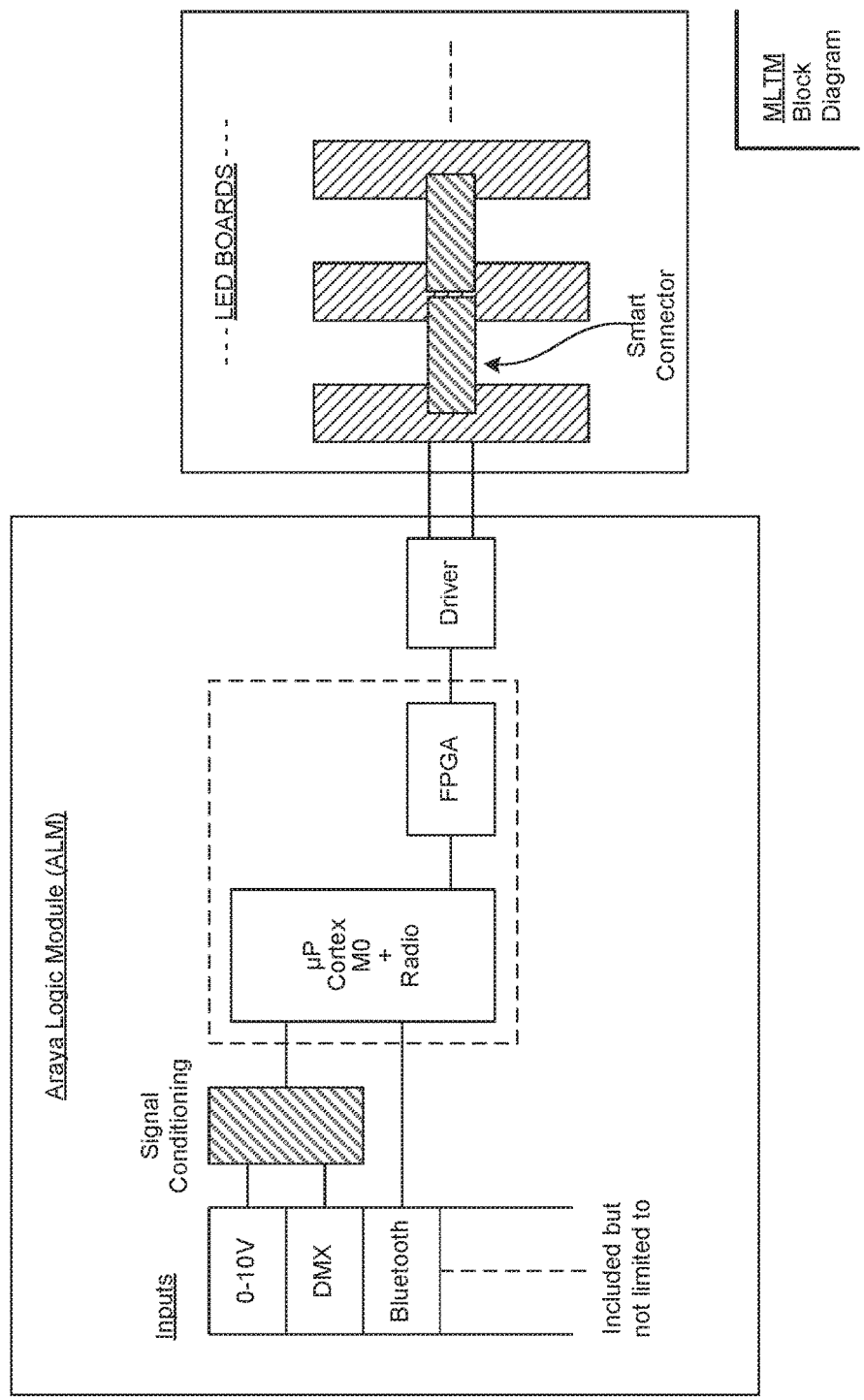
FIG. 6A is a high-level block diagram of an LED-based lighting system that includes a logic module connected to one or more LED boards.
Figure 6B:
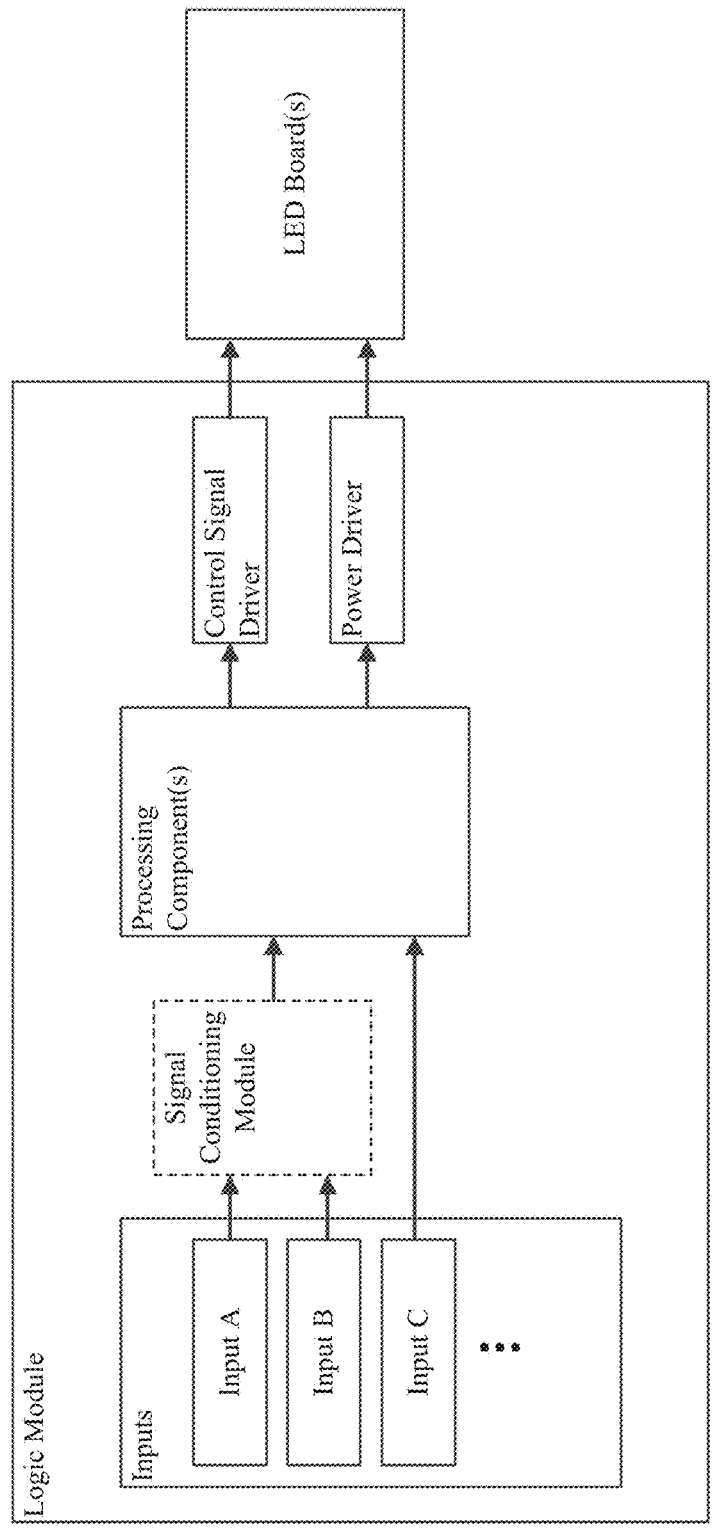
FIG. 6B is another high-level block diagrams of an LED-based lighting system that includes a logic module connected to one or more LED boards.
Figure 7:
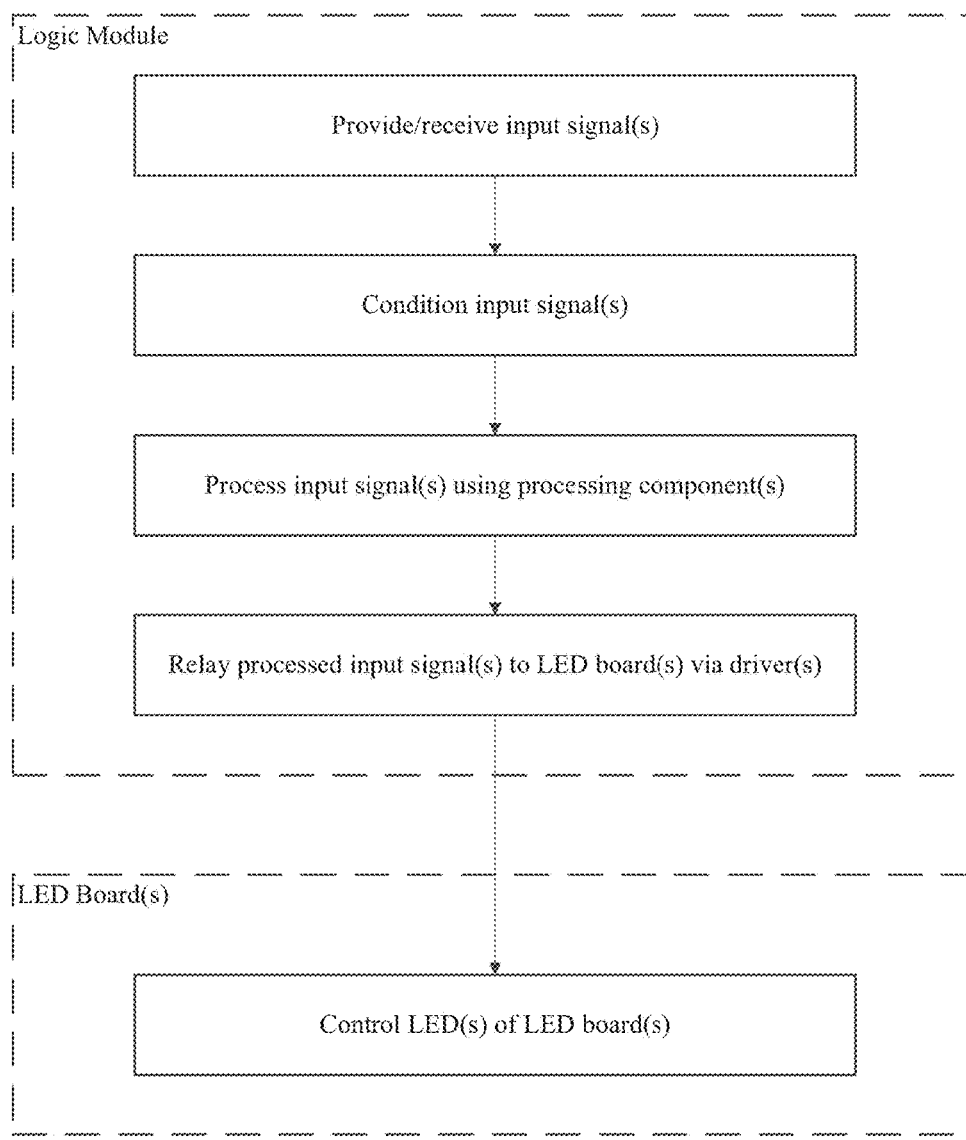
FIG. 7 depicts a process for controllably tuning one or more LED boards using a logic module.

FIGS. 6A-B are high-level block diagrams of an LED-based lighting system that includes a logic module connected to one or more LED boards, while FIG. 7 depicts a process for controllably tuning one or more LED boards using a logic module.

One or more input signals (e.g., input voltage, DMX, Bluetooth) are received by the logic module and relayed to one or more processing components. The processing component(s) can include, for example, a microprocessor, field-programmable gate array (FPGA), etc. In some embodiments, some or all of the input signal(s) are conditioned (e.g., by a signal conditioning module) before being provided to the processing component(s). For example, input signal(s) (e.g., pulse width modulated signals) for controlling each color channel of an LED board may be dithered to address several different issues. For instance, setting the frequency of a modulated input signal to a higher value (e.g., 25 kHz rather than 1 kHz) may eliminates acoustic noise and electronic flicker (also referred to as "e-flicker") that causes visible changes in the brightness of an electronic display (e.g., the screen of a mobile phone). E-flicker can be particularly problematic when trying to capture video of a scene due to a mismatch between the frame rate and the camera shutter speed.

As noted above, input signal(s) prompt the logic module to control one or more LED boards in a certain manner. For example, the processing component(s) may selectively control a control signal driver and/or a power driver that interface with the LED board(s).

In some embodiments, the logic module selectively controls a primary LED board (e.g., using the control signal driver and/or power driver) that is coupled to a secondary LED board. For example, the primary LED board could be coupled to the secondary LED board by a smart connector that causes the driver signals provided to the primary LED board by the logic module to also be provided to the secondary LED board. Similarly, the secondary LED board may be coupled to additional secondary LED board(s) that act in unison with the primary LED board.

Computer System

Figure 8:
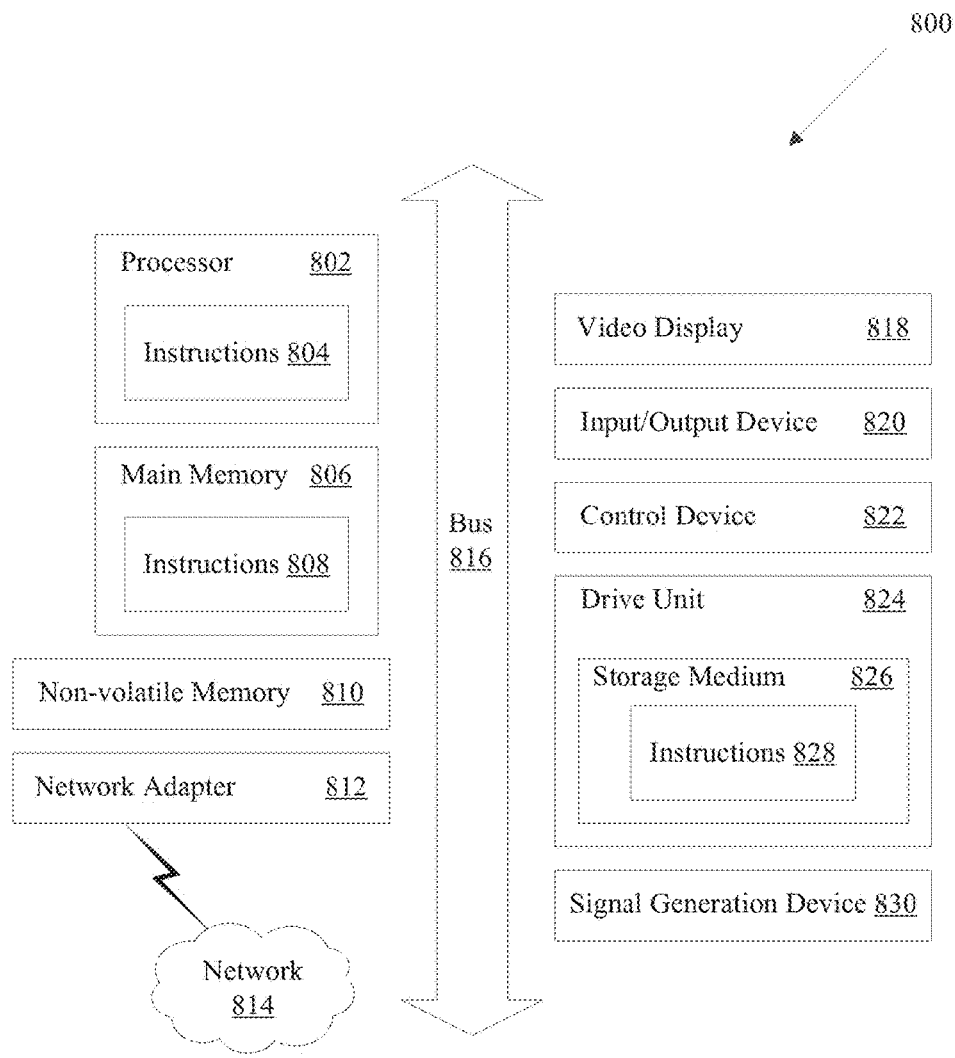
FIG. 8 is a block diagram illustrating an example of a computer system in which at least some operations described herein can be implemented.

FIG. 8 is a block diagram illustrating an example of a computing system 800 in which at least some operations described herein can be implemented. The computing system may include one or more central processing units ("processors") 802, main memory 806, non-volatile memory 810, network adapter 812 (e.g., network interfaces), video display 818, input/output devices 820, control device 822 (e.g., keyboard and pointing devices), drive unit 824 including a storage medium 526, and signal generation device 830 that are communicatively connected to a bus 816. The bus 816 is illustrated as an abstraction that represents any one or more separate physical buses, point to point connections, or both connected by appropriate bridges, adapters, or controllers. The bus 816, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the computing system 800 operates as a standalone device, although the computing system 800 may be connected (e.g., wired or wirelessly) to other machines. In a networked deployment, the computing system 800 may operate in the capacity of a server or a client machine in a client-server network environment, or as a peer machine in a peer-to-peer (or distributed) network environment.

The computing system 800 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a gaming device, a music player, any portable/mobile/handheld device, or any machine capable of executing a set of instructions (sequential or otherwise) that specify actions to be taken by the computing system.

While the main memory 806, non-volatile memory 810, and storage medium 826 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 828. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 804, 808, 828) set at various times in various memory and storage devices in a computer, and that, when read and executed by one or more processing units or processors 802, cause the computing system 800 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 810, floppy and other removable disks, hard disk drives, optical disks (e.g., Compact Disk Read-Only Memory (CD ROMS), Digital Versatile Disks, (DVDs)), and transmission type media such as digital and analog communication links.

The network adapter 812 enables the computing system 800 to mediate data in a network 814 with an entity that is external to the computing device 800, through any known and/or convenient communications protocol supported by the computing system 800 and the external entity. The network adapter 812 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can include, but are not limited to, intrusion-prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

Although the Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A lamp control system comprising:
a logic module that includes
an interface configured to couple with a lighting source having multiple color channels,
non-volatile memory configured to store a color model,
a processor configured to compute flux ratios from the multiple color channels based on the color model, and
a control signal driver configured to send the computed flux ratios as control signals to the lighting source via the interface; and
a light emitting diode-based (LED-based) lamp that includes an interface configured to couple with the logic module, two or more color strings, each color string comprising one or more light emitting diodes (LEDs) of a substantially similar color, non-volatile memory configured to store at least one spectral power density (SPD) distribution summary characterizing each color string, an optical sensor configured to measure brightness levels of the two or more color strings, and a processor configured to send at least a subset of the measured brightness levels and the SPD distribution summaries to the logic module via the interface.

2. The lamp control system of claim 1, wherein the logic module further includes:

a power driver configured to provide power to the LED-based lamp via the interface.

3. The lamp control system of claim 1, wherein the LED-based lamp includes a power source.

4. The lamp control system of claim 1, wherein the optical sensor of the LED-based lamp measures brightness of the two or more color strings one at a time by sequentially illuminating each color string for a specified amount of time.

5. The lamp control system of claim 1, wherein the processor of the logic module is further configured to:

detect when a brightness level of a color string of the LED-based lamp has experienced a change; and in response to detecting the change, recalibrate a corresponding color model based on the brightness level of the color string and a corresponding SPD distribution summary.

6. A lamp control system comprising:

a driverless light emitting diode-based (LED-based) lamp that includes one or more color strings, each color string comprising one or more light emitting diodes (LEDs) of a substantially similar color, and an optical sensor configured to generate readings specifying a brightness level of each of the one or more color strings; and a logic module that includes non-volatile memory configured to store a color model, a processor configured to determine appropriate adjustments for the driverless LED-based lamp based at least in part on the color model, the optical sensor readings, and one or more spectral power density (SPD) distribution summaries for the one or more color strings, and a control signal driver configured to send the appropriate adjustments as control signals to the driverless LED-based lamp.

7. The lamp control system of claim 6, wherein the one or more SPD distribution summaries for the one or more color strings are stored within non-volatile memory of the driverless LED-based lamp.

8. The lamp control system of claim 7, wherein the one or more SPD distribution summaries are stored in a quantized integer format.

9. The lamp control system of claim 6, wherein the one or more SPD distribution summaries for the one or more color strings are stored within cloud-based memory that is accessible to the logic module.

10. The lamp control system of claim 6, wherein the logic module further comprises a power driver configured to provide electric current to the LED-based lamp.

11. The lamp control system of claim 10, wherein the driverless LED-based lamp distributes the electric current to the one or more color strings based on the control signals provided by the control signal driver.

12. The lamp control system of claim 6, wherein the driverless LED-based lamp includes an interface for receiving a first end of a ribbon cable, and wherein the logic module includes an interface for receiving a second end of the ribbon cable.

13. The lamp control system of claim 12, wherein the ribbon cable includes a first wire channel corresponding to a color channel in the driverless LED-based lamp and a second wire channel corresponding to a feedback channel for sending information from the driverless LED-based lamp to the logic module.

14. The lamp control system of claim 13, wherein the information includes the optical sensor readings and the one or more SPD distribution summaries that are stored within non-volatile memory of the driverless LED-based lamp.

15. The lamp control system of claim 6, wherein each SPD distribution summary characterizes a corresponding color string with tristimulus values across various operating characteristics.

16. The lamp control system of claim 15, wherein the various operating characteristics include different electric current values and different temperature values.

17. The lamp control system of claim 6, wherein each SPD distribution summary includes a thermal matrix that characterizes thermal cross-talk between adjacent light sources in a corresponding color string and capacity characteristics of the adjacent light sources in the corresponding color string.

18. The lamp control system of claim 17, wherein the thermal matrix is provided to the logic module by the driverless LED-based lamp when re-calibrating the color model.

19. The lamp control system of claim 6, wherein the color model specifies a plurality of optimized flux ratios of the one or more color strings that produce a specific correlated color temperature at a given operating temperature.

20. The lamp control system of claim 6, wherein the control signals are represented as digitized commands or as analog values represented by an electrical voltage or current.

21. A method comprising:

generating a color model for a light emitting diode-based (LED-based) lamp having multiple color strings by
creating a series of spectral power density (SPD) distribution summaries for each color string,
wherein each SPD distribution summary characterizes a particular color string at a certain set of operating conditions;

storing the series of SPD distribution summaries in a non-volatile memory of the LED-based lamp;

determining a current operating condition of the LED-based lamp;

identifying a particular SPD distribution summary corresponding to the current operating condition;

transmitting the current operating condition and the particular SPD distribution summary to a logic module coupled to the LED-based lamp;

identifying, by the logic module, a corrective adjustment for at least one of the multiple color strings based on the current operating condition and the particular SPD distribution summary;

transmitting, by the logic module, a control signal representing the corrective adjustment to the LED-based lamp.

22. The method of claim 21, wherein the series of SPD distribution summaries are stored in the non-volatile memory of the LED-based lamp in a reduced file format.

23. The method of claim 21, wherein each color string includes one or more light emitting diodes (LEDs) of a substantially similar color.

24. The method of claim 21, wherein the current operating condition specifies a temperature value, an electric current value, or both.

* * * * *